(12) United States Patent
Carter et al.

(10) Patent No.: US 10,762,306 B2
(45) Date of Patent: Sep. 1, 2020

(54) COMPUTING SYSTEM WITH A CROSS-LOCALE NATURAL LANGUAGE SEARCHING MECHANISM AND METHOD OF OPERATION THEREOF

(71) Applicant: Telenav, Inc., Santa Clara, CA (US)

(72) Inventors: Casey Carter, Sunnyvale, CA (US); Shalu Grover, Sunnyvale, CA (US); Gregory Stewart Aist, Santa Clara, CA (US); Jinghai Ren, Milpitas, CA (US); Michele Santamaria, Seaside, CA (US)

(73) Assignee: Telenav, Inc., Santa Clara, CA (US)

( * ) Notice: Subject to any disclaimer, the term of this patent is extended or adjusted under 35 U.S.C. 154(b) by 8 days.

(21) Appl. No.: 15/855,628

(22) Filed: Dec. 27, 2017

(65) Prior Publication Data

US 2019/0197115 A1 Jun. 27, 2019

(51) Int. Cl.
*G06F 17/28* (2006.01)
*G06F 40/58* (2020.01)
*G06F 16/29* (2019.01)
*G06F 16/242* (2019.01)
*G06F 16/248* (2019.01)
*G06F 16/28* (2019.01)
*G06F 16/9537* (2019.01)
*G06F 40/30* (2020.01)
*G06F 3/0484* (2013.01)

(52) U.S. Cl.
CPC ............ *G06F 40/58* (2020.01); *G06F 16/243* (2019.01); *G06F 16/248* (2019.01); *G06F 16/285* (2019.01); *G06F 16/29* (2019.01); *G06F 16/9537* (2019.01); *G06F 40/30* (2020.01); *G06F 3/0484* (2013.01)

(58) Field of Classification Search
CPC .... G06F 17/289; G06F 16/243; G06F 16/285; G06F 16/9537; G06F 16/248; G06F 16/29; G06F 17/2785
USPC ...................................... 704/2, 3; 455/404.1
See application file for complete search history.

(56) References Cited

U.S. PATENT DOCUMENTS

| | | | |
|---|---|---|---|
| 6,356,865 B1 * | 3/2002 | Franz | G10L 15/26 704/2 |
| 8,521,122 B2 * | 8/2013 | Scott | G06F 40/58 455/404.1 |
| 9,535,906 B2 * | 1/2017 | Lee | G06F 1/1626 |
| 2003/0033312 A1 * | 2/2003 | Koizumi | G06F 17/2836 |
| 2008/0167807 A1 | 7/2008 | Chang et al. | |
| 2009/0048820 A1 * | 2/2009 | Buccella | G06F 17/289 704/2 |
| 2010/0036829 A1 * | 2/2010 | Leyba | G06F 16/3344 707/739 |

(Continued)

*Primary Examiner* — Md S Elahee
(74) *Attorney, Agent, or Firm* — Perspectives Law Group, Corp.

(57) ABSTRACT

A computing system comprising: a control unit configured to: receive an input request for a point of interest; determine a first linguistic context for the input request based on one or more input request characteristics, a user profile, a location, and a first connotation database; translate the input request to a second linguistic context based on a translation flag and a second connotation database, wherein the second connotation database is mapped to the first connotation database; and a user interface, coupled to the control unit, configured to display a translation result for the input request based on the first linguistic context or the second linguistic context.

20 Claims, 6 Drawing Sheets

(56) References Cited

U.S. PATENT DOCUMENTS

2013/0144598 A1* 6/2013 Kutsumi ................ G06F 40/40
                                                            704/2
2014/0280091 A1   9/2014 Nasarov et al.
2018/0150755 A1* 5/2018 Bai ....................... G06N 3/084

* cited by examiner

COMPUTING SYSTEM WITH A CROSS-LOCALE NATURAL LANGUAGE SEARCHING MECHANISM AND METHOD OF OPERATION THEREOF

TECHNICAL FIELD

An embodiment of the present invention relates generally to a computing system, and more particularly to a computing system with a cross-locale natural language searching mechanism.

BACKGROUND

Modern consumer and industrial electronics, especially devices such as cellular phones, smart phones, tablet computers, vehicle integrated computing and communication systems, portable digital assistants, and combination devices, are providing increasing levels of functionality to support modern life including communication services. Research and development in the existing technologies can take a myriad of different directions.

Location based applications offer a typical portfolio of services including: navigation, map lookup and display, and local business and point of interest search. These services are naturally tied together in that they are all location-based and assume that these services operate within a locale shared between a user and real-world objects of reference. That is to say that if the user is physically within the United States, then applications tend to assume that because the primary language within the United States is U.S. English, the user will want to navigate to locations named and expressed in U.S. English, ask to view maps of U.S. locations displayed with labels written in U.S. English, hear feedback spoken or displayed in U.S. English, and search for businesses and points of interest using names and concepts drawn from U.S. English. However, this assumption does not hold for everyone, for example, in the United States who is learning U.S. English or does not speak U.S. English at all. Thus, a need still remains to translate search terms from a user's native language into semantically equivalent search terms in a language associated with the data locale and insert this translation step between the search acceptance and result display stages of the search request processing.

Solutions to these problems have been long sought but prior developments have not taught or suggested any solutions and, thus, solutions to these problems have long eluded those skilled in the art.

SUMMARY

An embodiment of the present invention provides a computing system comprising: a control unit configured to: receive an input request for a point of interest; determine a first linguistic context for the input request based on one or more input request characteristics, a user profile, a location, and a first connotation database; translate the input request to a second linguistic context based on a translation flag and a second connotation database, wherein the second connotation database is mapped to the first connotation database; and a user interface, coupled to the control unit, configured to display a translation result for the input request based on the first linguistic context or the second linguistic context.

An embodiment of the present invention provides a computing system comprising: a first control unit configured to: receive an input request for a point of interest; determine a first linguistic context for the input request based on one or more input request characteristics, a user profile, a location, and a first connotation database; a communication unit, coupled to the first control unit, configured to: send a transmission of the input request to a second control unit based on a translation flag; receive a translation result for the input request based on a translation of the input request to a second linguistic context by the second control unit; the second control unit, coupled to the communication unit, configured to translate the input request to the second linguistic context based on the translation flag and a second connotation database, wherein the second connotation database is mapped to the first connotation database; and a user interface, coupled to the first control unit, configured to display a translation result for the input request based on the first linguistic context or the second linguistic context.

An embodiment of the present invention provides a method of operating a computing system comprising: receiving an input request for a point of interest; determining a first linguistic context for the input request based on one or more input request characteristics, a user profile, a location, and a first connotation database translating the input request to a second linguistic context based on a translation flag and a second connotation database, wherein the second connotation database is mapped to the first connotation database; and displaying a translation result for the input request based on the first linguistic context or the second linguistic context.

An embodiment of the present invention provides a non-transitory computer readable medium including instructions for operating a computing system comprising: receiving an input request for a point of interest; determining a first linguistic context for the input request based on one or more input request characteristics, a user profile, a location, and a first connotation database; translating the input request to a second linguistic context based on a translation flag and a second connotation database, wherein the second connotation database is mapped to the first connotation database; and displaying a translation result for the input request based on the first linguistic context or the second linguistic context.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
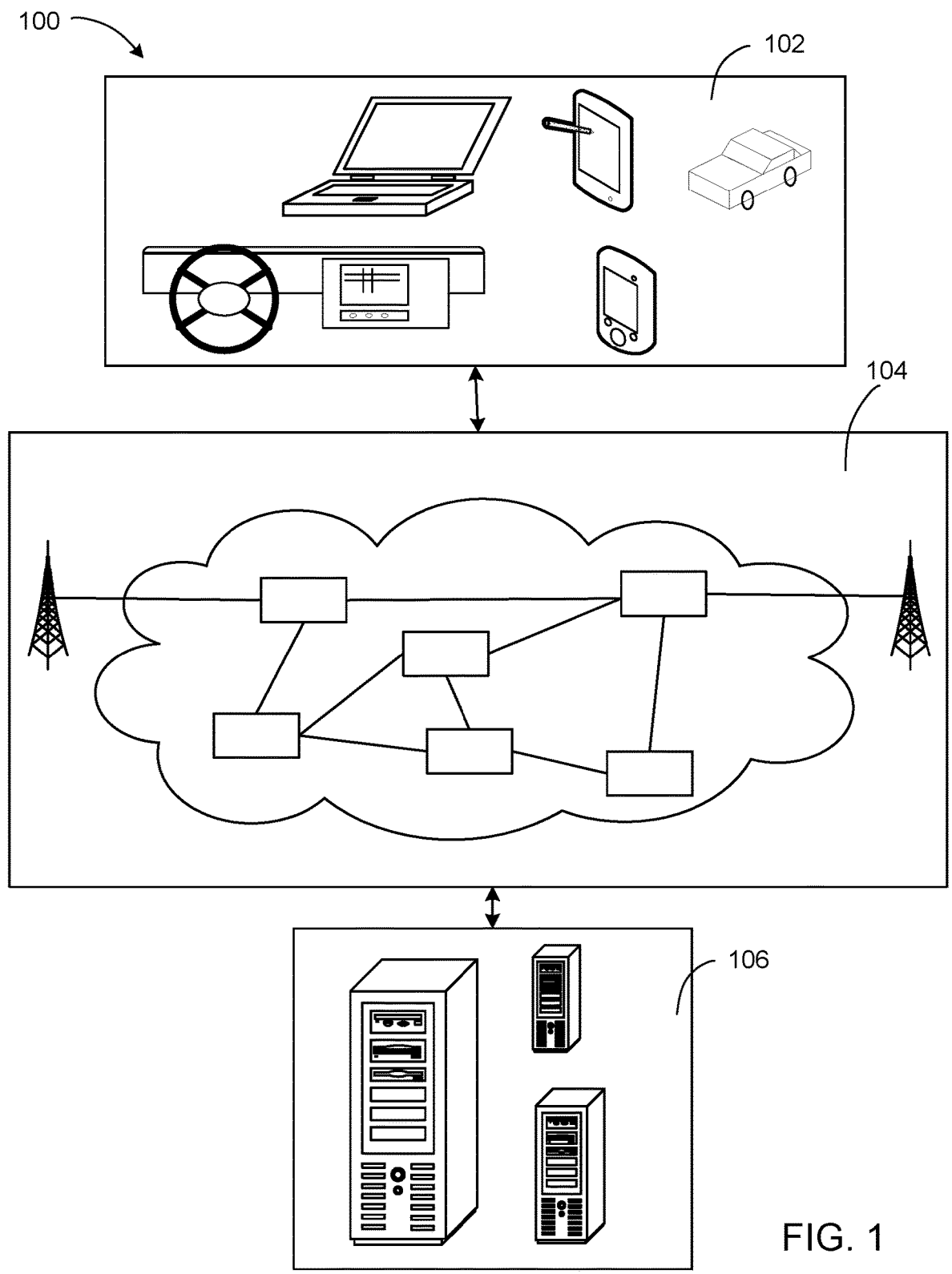
FIG. 1 is a computing system with a cross-locale natural language searching mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "vehicle" referred to herein can include cars, self-driving cars, trains, buses, bicycles, boats, motorcycles, airplanes, helicopters, or any other mode of transport, or a combination thereof in an embodiment of the present invention in accordance with the context in which the term is used.

The term "module" or "unit" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a micro-electromechanical system (MEMS), passive devices, or a combination thereof. Further, if a module is written in the system claims section below, the modules are deemed to include hardware circuitry for the purposes and the scope of system claims.

The modules in the following description of the embodiments can be coupled to one other as described or as shown. The coupling can be direct or indirect without or with, respectively, intervening items between coupled items. The coupling can be by physical contact or by communication between items.

Referring now to FIG. 1, therein is shown a computing system 100 with a cross-locale natural language searching mechanism in a first embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a smart phone, cellular phone, personal digital assistant, tablet computer, a notebook computer, laptop computer, desktop computer, or a vehicle integrated communication system. The first device 102 can couple, either directly or indirectly, to the communication path 104 to communicate with the second device 106 or can be a stand-alone device. The first device 102 can be incorporated in a vehicle.

The second device 106 can be any of a variety of centralized or decentralized computing devices. For example, the second device 106 can be a laptop computer, a desktop computer, grid-computing resources, a virtualized computer resource, cloud computing resources, routers, switches, peer-to-peer distributed computing devices, a server, or a combination thereof. The second device 106 can be centralized in a single room, distributed across different rooms, distributed across different geographical locations, embedded within a telecommunications network. The second device 106 can couple with the communication path 104 to communicate with the first device 102. The second device 106 can be incorporated in a vehicle.

For illustrative purposes, the computing system 100 is shown with the first device 102 as a client device, although it is understood that the computing system 100 can have the first device 102 as a different type of device. For example, the first device 102 can be a server. Also for illustrative purposes, the computing system 100 is shown with the second device 106 as a server, although it is understood that the computing system 100 can have the second device 106 as a different type of device. For example, the second device 106 can be a client device.

For brevity of description in the embodiments discussed below, the first device 102 will be described as a client device and the second device 106 will be described as a server device. The embodiments of the present invention, however, are not limited to this selection for the type of devices. The selection is an example of an embodiment of the present invention.

Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
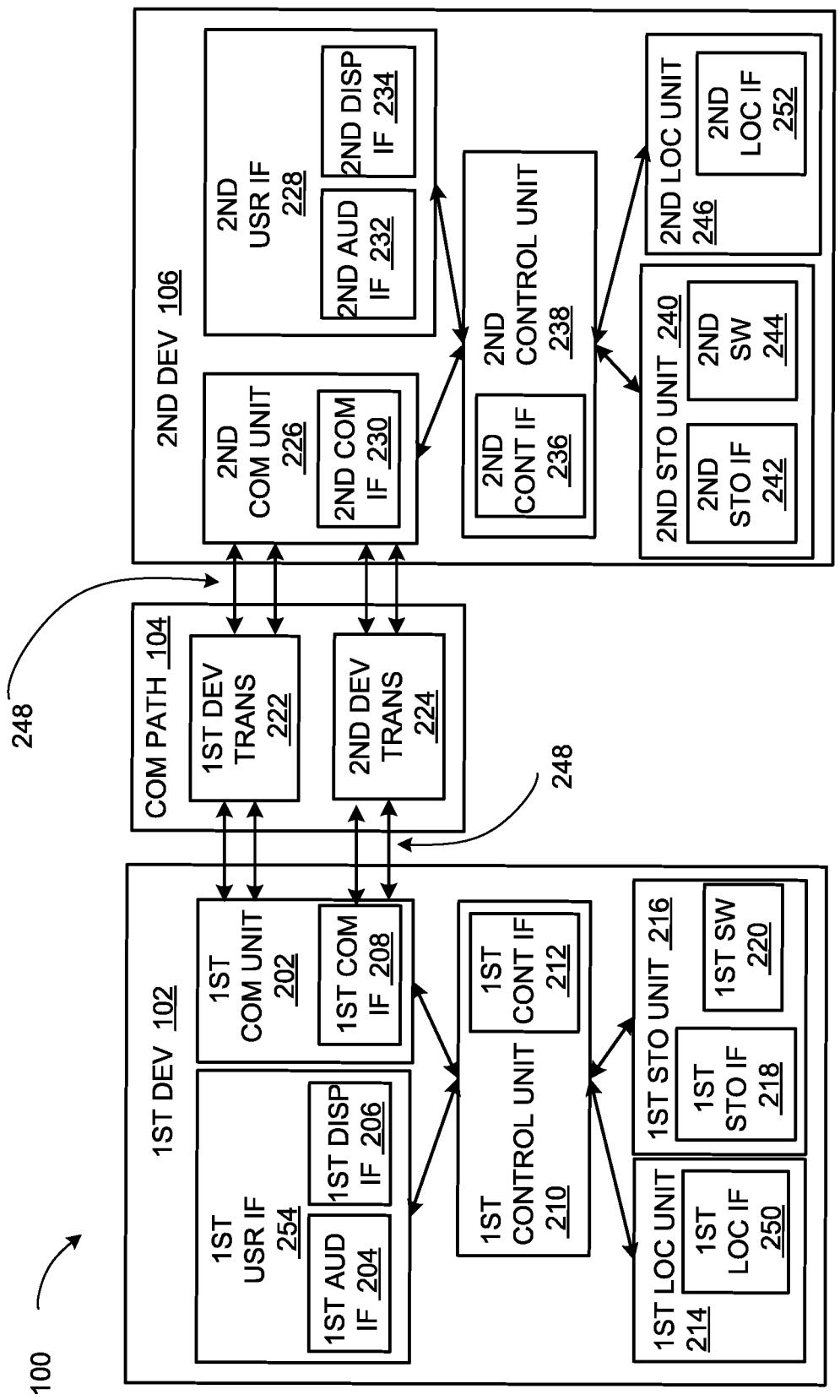
FIG. 2 is an exemplary block diagram of the components of the computing system.

Referring now to FIG. 2, therein is shown an exemplary block diagram of the components of the computing system 100. The first device 102 can send information in a first device transmission 222 over the communication path 104 to the second device 106. The second device 106 can send information in a second device transmission 224 over the communication path 104 to the first device 102. The first device transmission 222 and the second device transmission 224 can be sent over one or more communication channels 248. A communication channel 248 refers either to a physical transmission medium such as a wire, or to a logical connection over a multiplexed medium such as a radio channel.

For illustrative purposes, the computing system 100 is shown with the first device 102 as a client device, although it is understood that the computing system 100 can have the first device 102 as a different type of device. For example, the first device 102 can be a server.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 210, a first storage unit 216, a first communication unit 202, a first user interface 254, and a first location unit 214. The first control unit 210 can include a first control interface 212. The first control unit 210 can execute a first software 220 to provide the intelligence of the computing system 100. The first control unit 210 can be implemented in a number of different ways. For example, the first control unit 210 can be a processor, an application specific integrated circuit (ASIC), an embedded processor, a microprocessor, a hardware control logic, a hardware finite state machine (FSM), a digital signal processor (DSP), or a combination thereof.

The first control interface 212 can be used for communication between the first control unit 210 and other functional units in the first device 102. The first control interface 212 can also be used for communication that is external to the first device 102. The first control interface 212 can receive information from the other functional units or from external sources, or can transmit information to the other functional units or to external destinations. The external sources and the external destinations refer to sources and destinations external to the first device 102.

The first control interface 212 can be implemented in different ways and can include different implementations depending on which functional units or external units are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry, application programming interface, or a combination thereof.

The first storage unit 216 can store the first software 220. For illustrative purposes, the first storage unit 216 is shown as a single element, although it is understood that the first storage unit 216 can be a distribution of storage elements. Also for illustrative purposes, the computing system 100 is shown with the first storage unit 216 as a single hierarchy storage system, although it is understood that the computing system 100 can have the first storage unit 216 in a different configuration. For example, the first storage unit 216 can be formed with different storage technologies forming a memory hierarchal system including different levels of caching, main memory, rotating media, or off-line storage.

The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM).

The first storage unit 216 can include a first storage interface 218. The first storage interface 218 can be used for communication between the first storage unit 216 and other functional units in the first device 102. The first storage interface 218 can also be used for communication that is external to the first device 102. The first storage interface 218 can receive information from the other functional units or from external sources, or can transmit information to the other functional units or to external destinations. The external sources and the external destinations refer to sources and destinations external to the first device 102.

The first storage interface 218 can include different implementations depending on which functional units or external units are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106 of FIG. 1, an attachment, such as a peripheral device or a computer desktop, and the communication path 104.

The first communication unit 202 can also function as a communication hub allowing the first device 102 to function as part of the communication path 104 and not limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units in the first device 102. The first communication interface 208 can receive information from the other functional units or from external sources, or can transmit information to the other functional units or to external destinations. The external sources and the external destinations refer to sources and destinations external to the first device 102.

The first communication interface 208 can include different implementations depending on which functional units are being interfaced with the first communication unit 202. The first communication interface 208 can be implemented with technologies and techniques similar to the implementation of the first control interface 212.

The first communication unit 202 can couple with the communication path 104 to send information to the second device 106 in the first device transmission 222. The second device 106 can receive information in a second communication unit 226 from the first device transmission 222 of the communication path 104.

The first control unit 210 can operate the first user interface 254 to present information generated by the computing system 100. The first user interface 254, in one embodiment, allows a user of the computing system 100 to interface with the first device 102. The first user interface 254 can include an input device and an output device. Examples of the input device of the first user interface 254 can include a keypad, a touchpad, soft-keys, a keyboard, a microphone, sensors for receiving remote signals, or any combination thereof to provide data and communication inputs. Examples of the output device can include a first display interface 206 and a first audio interface 204.

The first control unit 210 can operate the first user interface 254 to present information generated by the computing system 100. The first control unit 210 can also execute the first software 220 for the other functions of the computing system 100. The first control unit 210 can further execute the first software 220 for interaction with the communication path 104 via the first communication unit 202.

The first display interface 206 can be any graphical user interface such as a display, a projector, a video screen, or any combination thereof. The first audio interface 204 can include sensors, speakers, microphones, headphones, subwoofers, surround sound components, transducers, or any combination thereof. The first display interface 206 and the first audio interface 204 allow a user of the computing system 100 to interact with the computing system 100.

The first location unit 214 can generate location information, current heading, and current speed of the first device 102, as examples. The first location unit 214 can be implemented in many ways. For example, the first location unit 214 can function as at least a part of a global positioning system (GPS) and can include components, such as a GPS receiver, an inertial navigation system, a cellular-tower location system, a pressure location system, or any combination thereof.

The first location unit 214 can include a first location interface 250. The first location interface 250 can be used for communication between the first location unit 214 and other functional units in the first device 102. The first location interface 250 can also be used for communication that is external to the first device 102. The first location interface 250 can be implemented with technologies and techniques similar to the implementation of the first control interface 212.

The second device 106 can be optimized for implementing an embodiment of the present invention in a multiple device embodiment with the first device 102. The second device 106 can provide additional or higher performance processing power compared to the first device 102. The second device 106 can include a second control unit 238, a second storage unit 240, a second communication unit 226, a second user interface 228, and a second location unit 246.

The second control unit 238 can include a second control interface 236. The second control unit 238 can execute a second software 244 to provide the intelligence of the computing system 100. The second software 244 can also operate independently or in conjunction with the first software 220. The second control unit 238 can provide additional performance compared to the first control unit 210.

The second control unit 238 can be implemented in a number of different ways. For example, the second control unit 238 can be a processor, an application specific integrated circuit (ASIC), an embedded processor, a microprocessor, a hardware control logic, a hardware finite state machine (FSM), a digital signal processor (DSP), or a combination thereof.

The second control interface 236 can be used for communication between the second control unit 238 and other functional units in the second device 106. The second control interface 236 can also be used for communication that is external to the second device 106. The second control interface 236 can receive information from the other functional units or from external sources, or can transmit information to the other functional units or to external destinations. The external sources and the external destinations refer to sources and destinations external to the second device 106.

The second control interface 236 can be implemented in different ways and can include different implementations depending on which functional units or external units are being interfaced with the second control interface 236. For example, the second control interface 236 can be implemented with a pressure sensor, an inertial sensor, a microelectromechanical system (MEMS), optical circuitry, waveguides, wireless circuitry, wireline circuitry, application programming interface, or a combination thereof.

The second storage unit 240 can store the second software 244. The second storage unit 240 can be sized to provide the additional storage capacity to supplement the first storage unit 216. For illustrative purposes, the second storage unit 240 is shown as a single element, although it is understood that the second storage unit 240 can be a distribution of storage elements. Also for illustrative purposes, the computing system 100 is shown with the second storage unit 240 as a single hierarchy storage system, although it is understood that the computing system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units in the second device 106. The second storage interface 242 can also be used for communication that is external to the second device 106. The second storage interface 242 can receive information from the other functional units or from external sources, or can transmit information to the other functional units or to external destinations. The external sources and the external destinations refer to sources and destinations external to the second device 106.

The second storage interface 242 can include different implementations depending on which functional units or external units are being interfaced with the second storage unit 240. The second storage interface 242 can be implemented with technologies and techniques similar to the implementation of the second control interface 236.

The second communication unit 226 can enable external communication to and from the second device 106. For example, the second communication unit 226 can permit the second device 106 to communicate with the first device 102 of FIG. 1, an attachment, such as a peripheral device or a computer desktop, and the communication path 104.

The second communication unit 226 can also function as a communication hub allowing the second device 106 to function as part of the communication path 104 and not limited to be an end point or terminal unit to the communication path 104. The second communication unit 226 can include active and passive components, such as microelectronics or an antenna, for interaction with the communication path 104.

The second communication unit 226 can include a second communication interface 230. The second communication interface 230 can be used for communication between the second communication unit 226 and other functional units in the second device 106. The second communication interface 230 can receive information from the other functional units or from external sources, or can transmit information to the other functional units or to external destinations. The external sources and the external destinations refer to sources and destinations external to the second device 106.

The second communication interface 230 can include different implementations depending on which functional units are being interfaced with the second communication unit 226. The second communication interface 230 can be implemented with technologies and techniques similar to the implementation of the second control interface 236.

The second communication unit 226 can couple with the communication path 104 to send information to the first device 102 in the second device transmission 224. The first device 102 can receive information in the first communication unit 202 from the second device transmission 224 of the communication path 104

The second control unit 238 can operate the second user interface 228 to present information generated by the computing system 100. The second user interface 228, in one embodiment, allows a user of the computing system 100 to interface with the second device 106. The second user interface 228 can include an input device and an output device. Examples of the input device of the second user interface 228 can include a keypad, a touchpad, soft-keys, a keyboard, a microphone, sensors for receiving remote signals, or any combination thereof to provide data and communication inputs. Examples of the output device can include a second display interface 234 and a second audio interface 232.

The second control unit 238 can operate the second user interface 228 to present information generated by the computing system 100. The second control unit 238 can also execute the second software 244 for the other functions of the computing system 100. The second control unit 238 can further execute the second software 244 for interaction with the communication path 104 via the second communication unit 226.

The second display interface 234 can be any graphical user interface such as a display, a projector, a video screen, or any combination thereof. The second audio interface 232 can include sensors, speakers, microphones, headphones, subwoofers, surround sound components, transducers, or any combination thereof. The second display interface 234 and the second audio interface 232 allow a user of the computing system 100 to interact with the computing system 100.

The second location unit 246 can generate location information, current heading, and current speed of the second device 106, as examples. The second location unit 246 can be implemented in many ways. For example, the second location unit 246 can function as at least a part of a global positioning system (GPS) and can include components, such as a GPS receiver, an inertial navigation system, a cellular-tower location system, a pressure location system, or any combination thereof.

The second location unit 246 can include a second location interface 252. The second location interface 252 can be used for communication between the second location unit 246 and other functional units in the second device 106. The second location interface 252 can also be used for communication that is external to the second device 106. The second location interface 252 can be implemented with technologies and techniques similar to the implementation of the second control interface 236.

Functionality of the computing system 100 can be provided by the first control unit 210, the second control unit 238, or a combination thereof. For illustrative purposes, the second device 106 is shown with the partition having the second user interface 228, the second storage unit 240, the second control unit 238, a second location unit 246, and the second communication unit 226, although it is understood that the second device 106 can have a different partition. For example, the second software 244 can be partitioned differently such that some or all of its function can be in the second control unit 238 and the second communication unit 226. Also, the second device 106 can include other functional units not shown in FIG. 2 for clarity.

The first device 102 can have a similar or different partition as the second device 106. The functional units in the first device 102 can work individually and independently of the other functional units. The first device 102 can work individually and independently from the second device 106 and the communication path 104. The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules, units, and functions of the computing system 100.

Figure 3:
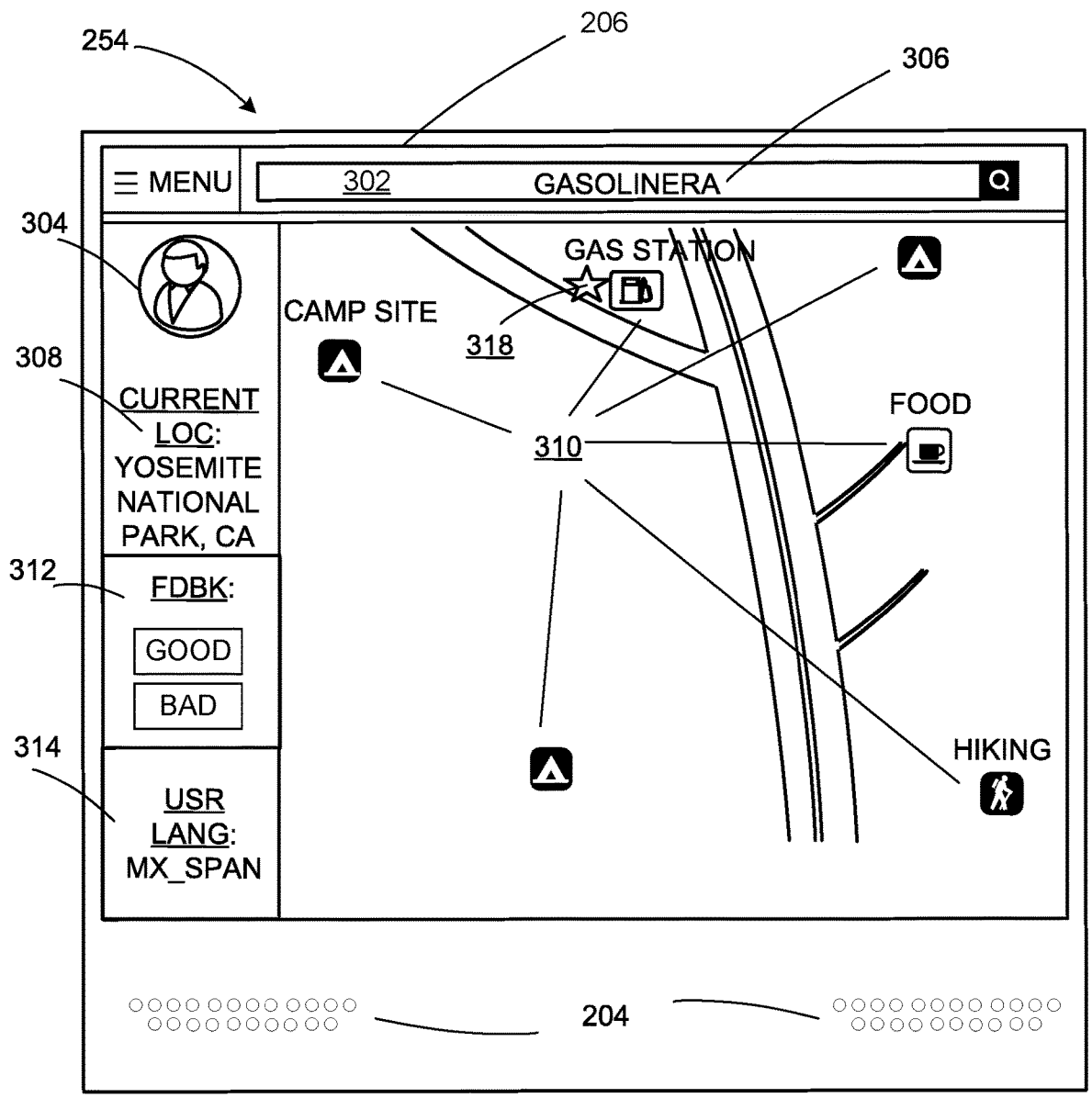
FIG. 3 is an example of a display interface of the computing system.

Referring now to FIG. 3, therein is shown an example of the first user interface 254 of the first device 102 or the second user interface 228 of the second device 106 of FIG. 1. For brevity of description in this embodiment, reference to the first user interface 254 will be made, however, the descriptions with respect to the first user interface 254 can be similarly applicable to the second user interface 228.

In one embodiment, the first user interface 254 includes the first display interface 206. The first display interface 206 can enable an input request 306 for a point of interest 310 using a search box 302. The input request 306 can include any manner of inputting a search request for the point of interest 310. The input request 306 can be any way by which a system user 304 can search for the point of interest 310, including but not limited to, searching using alpha-numeric characters, symbols, voice commands, gestures, or a combination thereof. The search box 302 can enable searching for the point of interest 310 using any search engine techniques, such as those used in a desktop search engine or a web search engine. Details of the search mechanism for the point of interest 310 will be discussed in greater detail below.

The point of interest 310 is a physical location that a system user 304 finds useful or interesting, or that a system user 304 or others might consider be particularly affiliating with or tied to a geographic area. For example, a point of interest 310 may be a store, a landmark, an office building or site, a park, an address, a point on a map, or another attraction that is popular among people of a geographic area.

Continuing with the example, the input request 306 can be input into the search box 302 using one or more languages. For example, the input request 306 can be input into the search box 302 in a system user's language 314. The system user's language 314 is a language understood by, spoken by, or native to the system user 304. As an example, the system user's language 314 can be designated by the system user 304. Also as an example, the system user's language 314 can be assigned automatically by the computing system 100 based on one or more characteristics of the input request 306. The one or more characteristics of the input request 306 refers to a linguistic property of the input request 306 and can include, for example, a syntax of the input request 306, language characters associated with the input request 306, a dialect designation of the input request 306, a sentence structure of the input request 306, a grammar of the input request 306, a linguistic pattern of the input request 306, phonemes of the input request 306, or any combination thereof.

The input request 306 can be in the same language or a different language as the system user's language 314 or the language associated with the system user's 304 current location 308. For example, if the system user's language 314 is assigned or designated to be "Mexican Spanish," the input request 306 can be input into the search box 302 using "Mexican Spanish" syntax, words, or phrases, despite the system user's 304 current location 308 being in, for example, Toronto, Canada, where the primary language is "Canadian English," and in which the points of interest 310 are typically designated in "Canadian English." In another example, if the system user's language 314 is assigned or designated to be "Mexican Spanish," the input request 306 can be input into the search box 302 using "Brazilian Portuguese" despite the system user's 304 current location 308 being in, for example, Toronto, Canada. The system user's language 314 can be associated with a profile associated with the system user 304. The system user's language 314 designation can be stored in the first storage unit 216, the second storage unit 240, or a combination thereof.

Continuing with the example, the input request 306 can be received by the computing system 100 in order for the computing system 100 to search for the point of interest 310 corresponding to the input request 306, either on the first device 102, the second device 106, or a combination thereof. Once received, the computing system 100 can search for the point of interest 310 corresponding to the input request 306 and return a translation result 318 to the first device 102, the second device 106, or a combination thereof, such that the translation result 318 is to be displayed on the first display interface 206, the second display interface 234, or a combination thereof. The translation result 318 refers to a value or a result returned based on the search for the point of interest 310, in which the input request 306 is matched to the closes relevant point or points of interest 310 based on the translation between the language of the input request 306 to the language of the system user's 304 current location 308. The first control unit 210, the second control unit 238, or a combination thereof can enable the search for the point of interest 310.

In one embodiment, the computing system 100 can search for the point of interest 310 on the second device 106 and return the translation result 318 to the first device 102. The first device 102 can display the translation result 318 on the first display interface 206. In another embodiment, the computing system 100 can search for the point of interest 310 on the first device 102 and return the translation result 318 to be displayed on the first display interface 206.

In another embodiment, the first audio interface 204, in conjunction with the first display interface 206, or by itself, can enable input of the input request 306 using audio commands. Audio commands are instructions given to the computing system 100 using an audio input, such as voice, or other acoustic, mechanical, or electrical frequencies corresponding to audible sound waves. For example, audio commands can be received through one or more sensors, microphones, transducers, or a combination thereof using the first audio interface 204. Similarly, the audio commands can be received in a similar manner through the second audio interface 232 of the second device 106. The audio commands can instruct the computing system 100 to search for the point of interest 310 in the same manner as described above.

Continuing with the example, in one embodiment, the computing system 100 can have a feedback mechanism allowing the system user 304 to give a feedback value 312 to the computing system 100 based on the translation result 318. The feedback value 312 can represent the quality of the translation result 318 returned by the computing system 100. For example, in one embodiment, if the input request 306 is "Gasolinera" and the computing system 100 returns a translation result 318 showing points of interest 310 as "gas stations," the system user 304 can give a feedback value 312 indicating the translation result 318 was satisfactory. Alternatively, if the input request is "Gasolinera" and the computing system 100 returns a translation result 318 showing the point of interest 310 as "restaurants," the system user 304 can give a feedback value 312 indicating the translation result 318 was unsatisfactory.

The feedback value 312 can also be provided implicitly. For example, in one embodiment, when the translation result 318 is returned, the system user 304 can navigate to the translation result 318 and doing nothing else. By doing so, the computing system 100 will know that the system user 304 was satisfied with the translation result 318.

The feedback value 312 can take a variety of forms. For example, the feedback value can take the form of any ranking system, including but not limited to, a numeric ranking system, a sliding scale ranking system, a binary input, a "good/bad" ranking, or a combination thereof. The feedback value 312 can be stored in the first storage unit 216, the second storage unit 240, or a combination thereof. The feedback value 312 can be used by the computing system 100 to refine a future translation result of a future input request for the input request 306. For example, in one embodiment, the feedback value 312 can be used to train the computing system 100 as a part of a machine learning algorithm or deep learning algorithm, using a supervised or an unsupervised machine learning mechanism, where the feedback value 312 can be used to teach the computing system 100 to learn patterns and representations for the input request 306 so that a future input request for the input request 306 yields more accurate and relevant results and returns better translation results 318.

Figure 4:
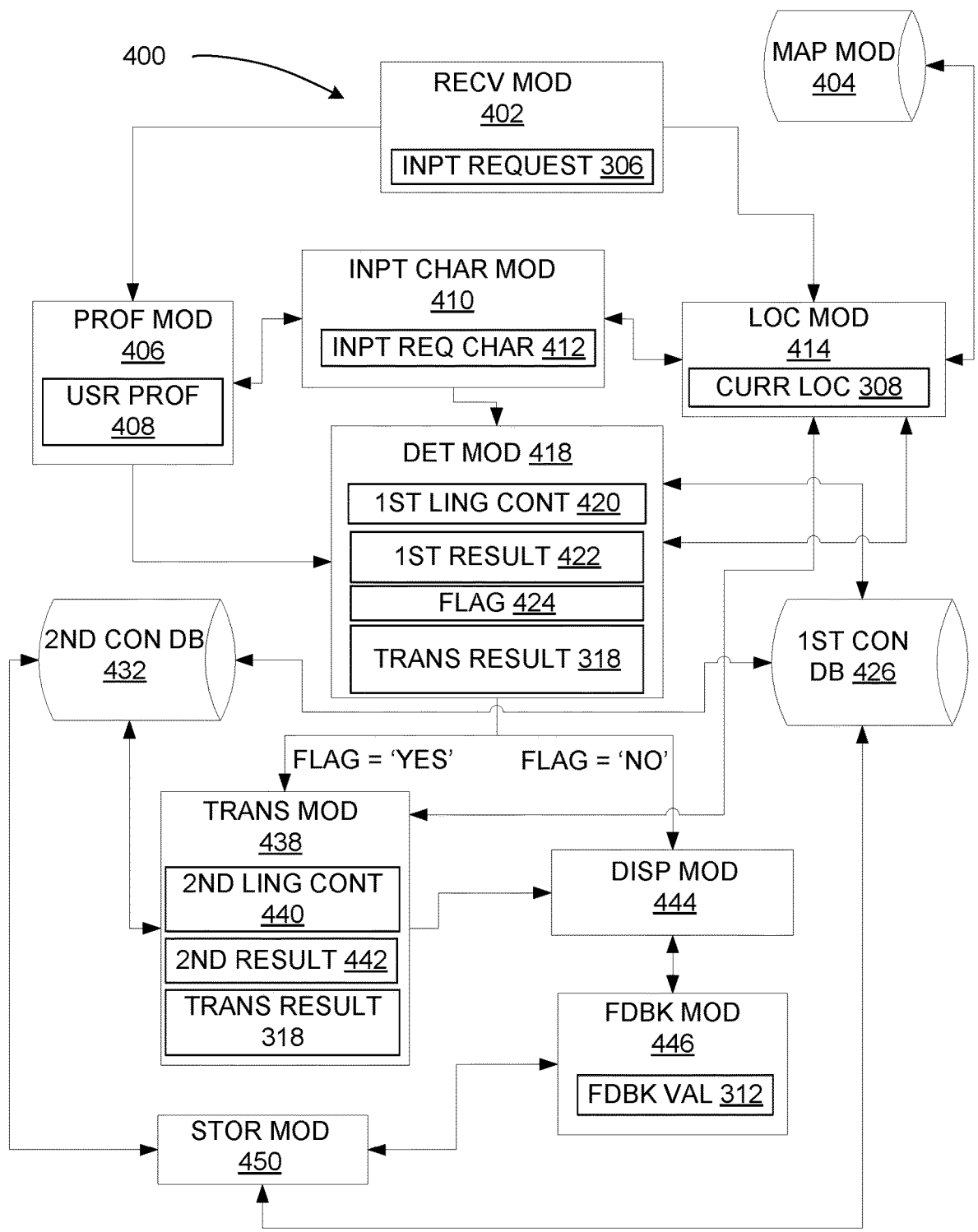
FIG. 4 is an exemplary control flow of the computing system.

Referring now to FIG. 4, therein is shown an exemplary control flow 400 of the computing system 100. The computing system 100 can include a receiver module 402, a profile module 406, an input characterization module 410, a location module 414, a map module 404, a determination module 418, a first connotation database 426, a second connotation database 432, a translation module 438, a display module 444, a feedback module 446, and a storage module 450.

In one embodiment, the receiver module 402 can be coupled to the profile module 406 and the location module 414. The location module 414 can be coupled to the map module 404, the input characterization module 410, the translation module 438, and the determination module 418. The profile module 406 can be coupled to the determination module 418 and the input characterization module 410. The input characterization module 410 can be coupled to the determination module 418. The determination module 418 can be coupled to the first connotation database 426, the translation module 438, and the display module 444. The translation module 438 can be coupled to the second connotation database 432 and the display module 444. The display module 444 can be coupled to the feedback module 446. The feedback module 446 can be coupled to the storage module 450. The storage module can be coupled to the first connotation database 426 and the second connotation database 432. The first connotation database 426 can be coupled to the second connotation database 432.

The first connotation database 426 and the second connotation database 432 are lexical databases of structured sets of terms and phrases of one or more languages that are categorized as sets of cognitive synonyms expressing a distinct concept. Terms and phrases are cognitively synonymous with another word if they refer to the same thing independently of context. The first connotation database 426 and the second connotation database 432 can have the sets of cognitive synonyms categorized based on a machine learning algorithm or deep learning algorithm, using a supervised or an unsupervised machine learning mechanism. The first connotation database 426 and the second connotation database 432 can have the sets of cognitive synonyms grouped in a variety of ways. For example, the sets of cognitive synonyms can be grouped based on word associations, real world relationships and sub-relationships, a specific cultural context of words or phrases, location information, a time and date information, a hypernym ("is-a") relationship, a meronym ("part-whole") relationship, a sisternym ("like-a") relationship, or a combination thereof.

The hypernym relationship describes relationships between cognitive synonyms in which one term has a broader meaning and that more specific words fall under or a superordinate to that term (i.e., "is-a"). For example, the term "color" is a hypernym of red. The meronym relationship describes relationships between cognitive synonyms in which one term denotes part of something which is used to refer to the whole of it (i.e., "part-whole"). For example, the term "faces" when used to mean people in the phrase "I see several familiar faces present" is a meronym of "people." A sisternym relationship describes relationships between cognitive synonyms in which one term refers to a concept that is similar to the concept expressed by another term but it not identical (i.e., "like-a"). For example, the term "coffee shop" is a sisternym of "cafe."

In one embodiment, for example, the first connotation database 426 and the second connotation database 432 can group the terms "restaurant," "gas station," and "cafe" together because in some locals, for example in the United States, each of a "restaurant," "gas station," and "cafe" are places where a person can obtain food, and therefore an input request 306 for "Food" should return the translation result 318 showing restaurants, gas stations, and cafes as relevant points of interest 310 where a system user 304 can get food. In another embodiment, the phrases "pet store," "zoo," and "farm" can be grouped together because these are places where animals can be seen.

In one embodiment, the receiver module 402 can enable the receiving of the input request 306 for a point of interest 310, as described with respect to FIG. 3. The receiver module 402 can pass control of the input request 306 to the profile module 406, the location module 414, or a combination thereof.

Continuing with the example, if control is passed to the profile module 406, the profile module 406 can analyze the input request 306 against a user profile 408, using the input characterization module 410 to determine whether the input request 306 can be matched to an assigned or designated system user's language 314 that is assigned or designated in a user profile 408. The user profile 408 is a description or a representation of the system user 304. The user profile 408 can include user identification as information utilized for identifying the system user 304. For example, the user identification can include a name, a government-issued identification information, an account name or identification, a contact information, physical features or traits of the system user 304, voice recognition meta-data of the system user 304, system user 304 preferences, assigned or designated system user's languages 314, or a combination thereof.

If the input characterization module 410 finds a match, the profile module 406, the input characterization module 410, or a combination thereof can pass one or more indicators to the determination module 418 indicating that the first connotation database 426 to be accessed when determining the first linguistic context 420 should be one with cognitive synonym sets assigned and associated with the system user's language 314.

The one or more indicators refer to an associated symbolic name, which contains some known or unknown quantity of information referred to as a value. For example, in one embodiment, if the system user's language 314 is designated as "Mexican Spanish" and the input characterization module 410 determines that the input request 306 is also input in "Mexican Spanish" by analyzing the syntax, words, phrases, or a combination thereof of the input request 306, then a match is found and the profile module 406, the input characterization module 410, or a combination thereof can pass a symbolic name such as "MX_SP" to the determination module 418 indicating that the first connotation database 426 to be accessed should contain cognitive synonym sets for the "Mexican Spanish" language.

Continuing with the example, in one embodiment, the receiver module 402 can pass control of the input request 306 to the location module 414, either by itself or in conjunction with passing control of the input request 306 to the profile module 406. The location module 414 can use the first location unit 214, the second location unit 246, or a combination thereof to obtain the system user's 304 current location 308. The location module 414 can analyze the input request 306 against the system user's 304 current location 308, using the input characterization module 410 to determine whether the language of the input request 306 can be matched to the language associated with the locale of the system user's 304 current location 308. If a match is found, the location module 414, the input characterization module 410, or a combination thereof can pass one or more indicators to the determination module 418 indicating that the first connotation database 426 to be accessed when determining the first linguistic context 420 should be one with cognitive synonym sets assigned and associated with the system user's 304 current location 308. For example, in one embodiment, if the input request 306 is determined to be input in "Mexican Spanish," and the location module 414 determines that the system user's 304 current location 308 is in Mexico City, Mexico, the location module 414, the input characterization module 410, or a combination thereof can pass a symbolic name such as "MX_SP" to the determination module 418 indicating that the first connotation database 426 to be accessed should contain cognitive synonym sets for the "Mexican Spanish" language.

In one embodiment, the location module 414 can obtain the system user's 304 current location 308 using the first location unit 214, the second location unit 246, or a combination thereof in conjunction with a map module 404 holding map information of a variety of countries, regions, states, counties, cities, neighborhoods, blocks or a combination thereof. The map module 404 can also contain information regarding points of interest 310 or can interface with a further database containing information regarding points of interest 310.

The input characterization module 410 can allow the profile module 406, the location module 414, or a combination thereof to identify the language of the input request 306 using one or more input request characteristics 412. The input characterization module 410 can do so by analyzing one or more input request characteristics 412 of the input request 306 in order to categorize, determine, or otherwise identify the language of the input request 306. For example, in one embodiment, the input characterization module 410 can analyze the syntax of the input request 306 and compare the syntax of the input request 306 to the syntax for a set of known languages to determine the language of the input request 306. In another embodiment, the input characterization module 410 can analyze the language characters associated with the input request 306 using, for example, an optical character recognition (OCR) technique, and compare the characters of the input request 306 to a set of known characters for known languages to determine the language of the input request 306. In another embodiment, where the input request 306 is given through a voice command through the first audio interface 204, the second audio interface 232, or a combination thereof, the input characterization module 410 can analyze the voice command by comparing a sound or an audible signal to a set of known sounds, dialects, phonetic tones, or a combination thereof of known languages to determine the language of the input request 306. Analyzing the voice command can be done using any number of techniques including but not limited to those used in speech recognition system based on Hidden Markov Models (HMM), dynamic time warping (DTW) based speech recognition, neural networks, end-to-end automatic speech recognition, or a combination thereof. In another embodiment, the input characterization module 410 can analyze a sentence structure of the input request 306, a grammar of the input request 306, a linguistic pattern of the input request 306, or any combination thereof using text recognition techniques to determine the language of the input request 306.

In another embodiment, if no system user language 314 is assigned or designated in the user profile 408, the input characterization module 410 can analyze the input request 306 using the techniques described above in order to recognize the input request 306 language without reference to the user profile 408. In one embodiment, once the input characterization module 410 is able to determine the language of the input request 306, the input characterization module 410 can assign or designate the language to the user profile 408.

Continuing with the example, once control is passed to the determination module 418, the determination module 418 can determine the first linguistic context 420 for the input request 306. The first linguistic context 420 indicates how the meaning of the input request 306 is understood by a system user 304 or by a person or persons who speak the system user's language 314. For example, in one embodiment, if the input request 306 is "Gasolinera," the first linguistic context 420 allows the computing system 100 to determine that the system user 304 would like to search for a "gas station" despite, for example, the system user 304 being in an area that does not have "Mexican Spanish" as the primary language of the locale, for example in Canada, and where the points of interest 310 are not designated in "Mexican Spanish." Similarly, if the input request 306 is "Happy Hour" the first linguistic context 420 allows the computing system 100 to determine that the system user 304 likely wants to look for businesses or establishments serving alcoholic beverages within a certain time period. The first linguistic context 420 enables the system user 304 to search for the points of interest 310 using the input request 306 without the system user 304 needing to know or understand the language associated with the system user's 304 current location 308. Details of the first linguistic context 420 will be discussed below. The second linguistic context 440 provides similar functionality as the first linguistic context 420. Details of the second linguistic context 440 will be discussed below The determination module 418 can determine the first linguistic context 420 using the first connotation database 426 and the one or more indicators passed to the determination module 418 by the profile module 406, the input characterization module 410, the location module 414, or a combination thereof. In one embodiment, the first linguistic context 420 can be determined based on the language of the input request 306 matching the language associated with the locale of the system user's 304 current location 308. For example, if the language of input request 306 matches the language associated with the system user's 304 current location 308, the determination module 418 can access a first connotation database 426 associated with the matching language. For example, if the language of the input request 306 is "Mexican Spanish" and the current location 308 is Mexico City, Mexico, the first connotation database 426 to be accessed can be associated with and contain cognitive synonym sets for the "Mexican Spanish" language.

Continuing with the example, where the language of the input request 306 matches the language associated with the system user's 304 current location 308 and the first connotation database 426 is determined, the first linguistic context 420 can be determined based on a mapping of the input request 306 to the words, phrases, categories, or a combination thereof contained in the first connotation database 426 that are similar to, identical to, related to or otherwise associated with the words, phrases, categories, associated with the input request 306. The determination module 418 can assign the mapping by applying an identity transform or a data mapping of the input request 306 to the first connotation database 426.

The identity transform or data mapping refer to a data transformation that copies a source data from a first connotation database 426, the second connotation database 432, or a combination thereof to the determination module 418, the translation module 438, the first connotation database 426, the second connotation database 432, or a combination thereof.

For example, if the input request 306 is for "Gasolinera," the determination module 418 can access the first connotation database 426 associated with the "Mexican Spanish" language and search for words, terms, phrases, categories, or a combination thereof categorized in the first connotation database 426 and matching or associated with "Gasolinera." Once found, the first connotation database 426 can return a first result 422 based on or containing the matching words, terms, phrases, categories, or a combination thereof to the determination module 418 based on the identity transform or the data mapping. The determination module 418 can assign the first linguistic context 420 as the first result 422 and search for the point of interest 310 based on the first linguistic context 420. The determination module 418 can search for the point of interest 310 using the location module 414 and the map module 404 based on the first linguistic context 420 and return a translation result 318 associated with the search.

Continuing with the example, in another embodiment, if the one or more indicators passed by the profile module 406, the input characterization module 410, the location module 414, or a combination thereof indicate that the language of the input request 306 does not match the language associated with the locale of the system user's 304 current location 308, the determination module 418 can determine that the first connotation database 426 to be accessed should be associated with the language associated with the input request 306. For example, in one embodiment, if the language of the input request 306 is in "Mexican Spanish" and the current location 308 is Toronto, Canada, the determination module 418 can determine that the first connotation database 426 to be accessed should be one associated with and contain cognitive synonym sets for the "Mexican Spanish" language. The determination module can also set a flag 424 indicating that the language of the input request 306 and language associated with the locale of the system user's 304 current location 308 do not match and that further processing of the input request 306 is required by the translation module 438. Details regarding the further processing will be discussed below. The flag 424 refers to a software or hardware mark, variable, condition, or a combination thereof that signals a particular condition or status.

Continuing with the example, in one embodiment, if no further processing is required, the determination module 418 can pass control to the display module 444 to display the translation result 318 on the first display interface 206, the second display interface 234, or a combination thereof.

In another embodiment, if further processing is required, the determination module 418 can pass control to the translation module 438. The translation module 438 can determine a second linguistic context 440 for the input request 306. The second linguistic context 440 provides similar functionality as the first linguistic context 420. The translation module 438 can determine the second linguistic context 440 in the same manner in which the first linguistic context 420 is determined, except using a second connotation database 432 associated with the language associated with the locale of system user's 304 current location 308. For example, in one embodiment, if the system user's 304 current location 308 is New York City, U.S.A, the second connotation database 432 to be accessed is one associated with and containing cognitive synonym sets for the "U.S. English" language. Once the first connotation database 426 and the second connotation database 432 are determined, the second linguistic context 440 can be determined by the translation module 438 as a mapping of the words, phrases, categories, or a combination thereof associated with the first linguistic context 420 mapped to the equivalent words, phrases, categories, or a combination thereof in the second connotation database 432.

The translation module 438 can assign the mapping by applying an identity transform or a data mapping similar to that described above with respect to first connotation database 426, determination module 418, and the input request 306 when a matching language is found. Details regarding the mapping will be discussed below.

Continuing with the example, once the mapping of the first linguistic context 420 to the second connotation database 432 is done, the second connotation database 432 can return a second result 442 to the translation module 438 based on the mapping. The translation module 438 can assign the second linguistic context 440 as the second result 442 and determine that the search for the point of interest 310 associated with the input request 306 should include a search for the words, phrases, categories, or a combination thereof associated with the second linguistic context 440. The translation module 438 can search for the point of interest 310 using the location module 414 and the map module 404 based on the second linguistic context 440 and return a translation result 318 associated with the search. Once the translation result 318 is returned the translation module 438 can pass control to the display module 444 to display the translation result 318 on the first display interface 206, the second display interface 234, or a combination thereof.

Continuing with the example, in one embodiment, once the translation result 318 is displayed on the first display interface 206, the second display interface 234 or a combination thereof, control can pass to the feedback module 446 to allow the feedback value 312 to be received by the computing system 100 in manner described in FIG. 3. The feedback module 446 can enable the feedback value 312 to be received using the first display interface 206, the second display interface 234, the first audio interface 204, the second audio interface 232, or a combination thereof. For example, in one embodiment, the feedback value 312 can be received by the computing system 100 through an entry from the first display interface 206, the second display interface 234, or a combination thereof. In another embodiment, the feedback module 446 enable the feedback value 312 to be received by the computing system 100 through a voice command through the first audio interface 204, the second audio interface 232, or a combination thereof. In another embodiment, the feedback module 446 can interface with a further database to provide the feedback value 312.

Once received, in one embodiment, the feedback module 446 can pass the feedback value 312 to the storage module 450. The storage module 450 can enable the storage of the feedback value 312 in the first storage unit 216, the second storage unit 240, or a combination thereof. The feedback value 312 can be used by the computing system 100 to refine a future translation result of a future input request for the input request 306 in a manner described in FIG. 3. For example, in one embodiment, the storage module 450 can interface with the first connotation database 426, the second connotation database 432, or a combination thereof to modify the sets of cognitive synonyms in the first connotation database 426, the second connotation database 432, or a combination thereof based on the feedback value 312 to provide better results for a future input request. The computing system 100 can achieve this modification by for example, rearranging, re-categorizing, reclassifying, or otherwise changing the word, phrase, term, or category associations in the first connotation database 426, the second connotation database 432, or a combination thereof to provide more relevant mappings or data transformations for a future input request for the input request 306.

For example, in one embodiment, if the input request 306 is for "Gasolinera" and the translation result 318 displayed is for a "restaurant," the feedback value 312 can indicate an unsatisfactory result. This unsatisfactory result can be passed to the first connotation database 426, the second connotation database 432, or a combination thereof such that the sets of cognitive synonyms in the first connotation database 426, the second connotation database 432, or a combination thereof can be rearranged, re-categorized, reclassified, or otherwise changed to disassociate "restaurants" from the term "Gasolinera" to provide more relevant mappings or data transformations for a future input request for the input request 306.

In one embodiment, the rearranging, re-categorizing, or reclassification can be based on the feedback module 446 monitoring the system user's 304 actions subsequent receiving the unsatisfactory feedback 446. For example, in one embodiment, the feedback module 446 can monitor one or more of the system user's 304 actions using one or more components of the computing system 100, for example sensors, microphones, transducers, the first location unit 214, the second location unit 246, or any combination thereof. For example, in one embodiment, the feedback module 444 can monitor the system user's 304 navigation path to determine where the system user's 304 destination ends during a trip in which the system user 304 searches for an input request 306, such that the address of the destination and the address of the translation result 318 can be compared to determine relationships and attributes similar or different between the two such that further categorizations or cognitive synonymous relationships can be generated based on those relationships and attributes. For example, if the input request 306 is for "Food" and a "gas station" is not returned as a translation result 318 in a locale where gas stations also serve food, the feedback module 446 can monitor the system user's 304 navigation path and if the system user 304 ends up at a gas station, can determine that a "gas station" should be categorized under a search for "food" in the future when the input request 306 is for "Food" in the particular locale. The first connotation database 426, the second connotation database 432, or a combination thereof can then be updated with the updated categorization, relationship, or attribute for future input requests associated with "Food" in that locale.

The computing system 100 has been described with module functions or order as an example. The computing system 100 can partition the modules differently or order the modules differently. For example, the first software 220 of FIG. 2 of the first device 102 can include the modules for the computing system 100. As a specific example, the first software 220 can include the receiver module 402, the profile module 406, the input characterization module 410, the location module 414, the map module 404, the determination module 418, the first connotation database 426, the second connotation database 432, the translation module 438, the display module 444, the feedback module 446, and the storage module 450, and associated sub-modules included therein.

The first control unit 210 of FIG. 2 can execute the first software 220 to operate the modules. For example, the first control unit 210 can implement the receiver module 402, the profile module 406, the input characterization module 410, the location module 414, the map module 404, the determination module 418, the first connotation database 426, the second connotation database 432, the translation module 438, the display module 444, the feedback module 446, and the storage module 450, and associated sub-modules included therein.

In another example of module partitions, the second software 244 of FIG. 2 of the second device 106 can include the modules for the computing system 100. As a specific example, the second software 244 can include the receiver module 402, the profile module 406, the input characterization module 410, the location module 414, the map module 404, the determination module 418, the first connotation database 426, the second connotation database 432, the translation module 438, the display module 444, the feedback module 446, and the storage module 450, and associated sub-modules included therein.

The second control unit 238 of FIG. 2 can execute the second software 244 to operate the modules. For example, the second control unit 238 can implement the receiver module 402, the profile module 406, the input characterization module 410, the location module 414, the map module 404, the determination module 418, the first connotation database 426, the second connotation database 432, the translation module 438, the display module 444, the feedback module 446, and the storage module 450, and associated sub-modules included therein.

The computing system 100 has been described with module functions or order as an example. The computing system 100 can partition the modules differently or order the modules differently.

The modules described in this application can be implemented as instructions stored on a non-transitory computer readable medium to be executed by a first control unit 210, the second control unit 238, or a combination thereof. The non-transitory computer medium can include the first storage unit 216, the second storage unit 240, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 5:
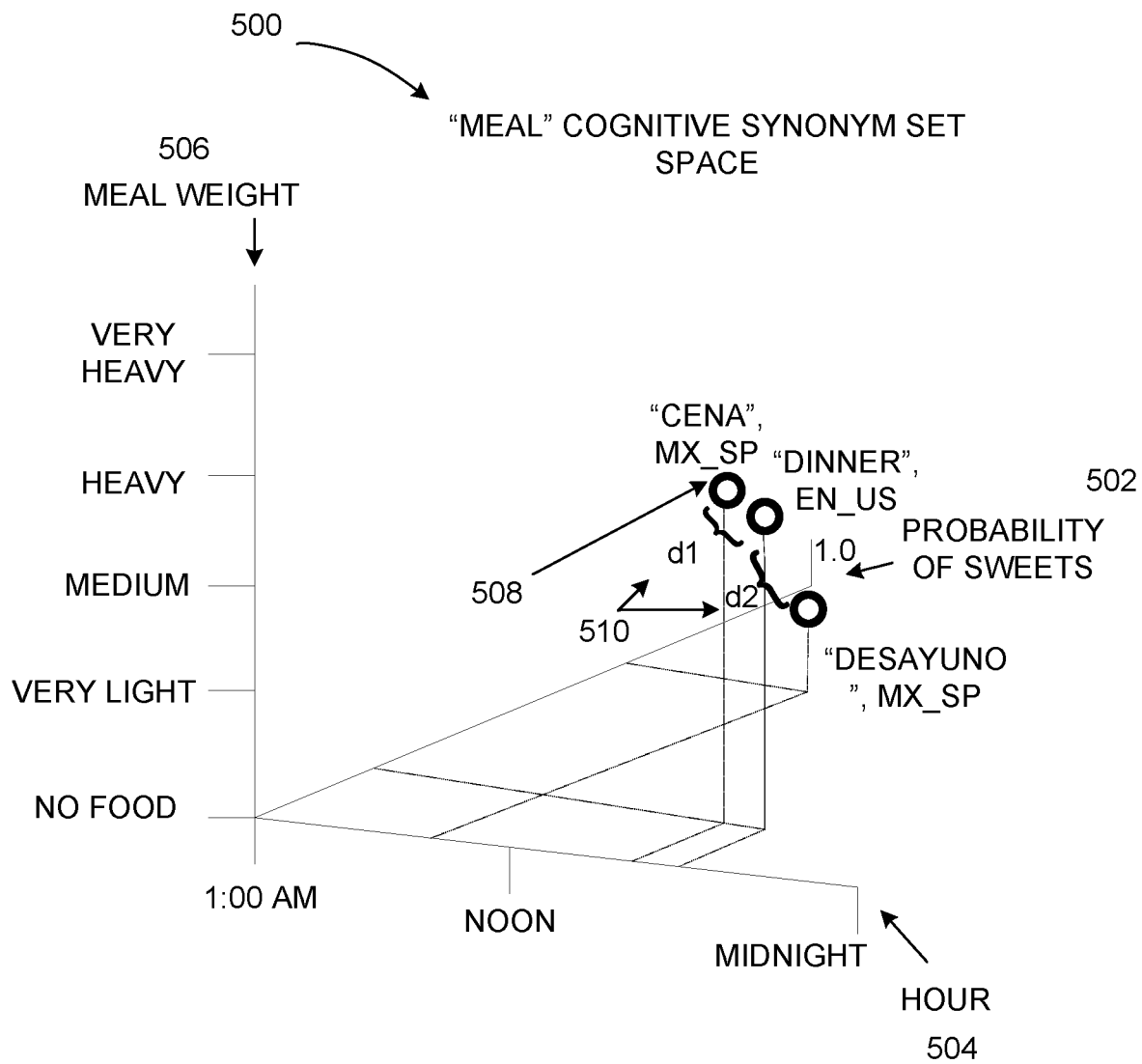
FIG. 5 is an exemplary representation of a cognitive synonym space for the computing system.

Referring now to FIG. 5, therein is shown an exemplary representation of a cognitive synonym space 500 for the computing system 100. Specifically, FIG. 5 shows the cognitive synonym space 500 for the first connotation database 426, the second connotation database 432, or a combination thereof. The cognitive synonym space 500 represents how words, terms, phrases, categories, or a combination thereof in the first connotation database 426, the second connotation database 432, or a combination thereof are grouped and mapped to one another as cognitive synonym sets. FIG. 5 represents only one embodiment for a cognitive synonym space 500. The example used in FIG. 5 is for the input request 306 "Meal." Cognitive synonym spaces 500 for other input requests 306 can be represented similarly.

Continuing with the example, in one embodiment, assuming the input request 306 is for "Meal," the cognitive synonym space 500 can include one or more measures that allow the determination module 418, the translation module 438, the first connotation database 426, the second connotation database 432, or a combination thereof to perform the identity transform or the data mapping for the input request 306, such that the first linguistic context 420, the second linguistic context 440, or a combination thereof can be determined across one or more languages. The one or more measures can be represented as one or more variables, meta-data, parameters, or a combination thereof in the first connotation database 426, the second connotation database 432, or a combination thereof.

For example, for the input request 306 "Meal," the cognitive synonym space 500 can include one or more variables, meta-data, parameters, or a combination thereof that allows the determination module 418, the translation module 438, the first connotation database 426, the second connotation database 432, or a combination thereof to map the input request 306 to words, terms, phrases, or categories associated with "Meal" in the first connotation database 426, the second connotation database 432, or a combination thereof. For the input request 306 "Meal," these can include, for example, a weight measure 506, a probability measure 502, and a time measure 504. Other variables, meta-data, or parameters can be used and the aforementioned are exemplary, and are set forth for brevity of discussion and to better explain the example discussed in FIG. 5.

Continuing with the example, for the input request 306 "Meal," the weight measure 506 can refer to a degree, a quantity, a measure, or a combination thereof of the input request 306. For example, a meal can contain a degree representing a "heaviness" of the meal which is associated with how much food is typically eaten during a meal. For example, meals can be categorized from "Very Light" representing that very little food is typically eaten during that meal, to "Very Heavy" representing that a large quantity of food is typically eaten during that meal. Examples of "Very Light" meals can include snacks or breakfasts. Examples of "Very Heavy" meals can include dinners, lunches, or feasts. The weight measure 506 can vary amongst different connotation databases associated with different languages. For example, connotation databases associated with languages in which the culture associated with that language considers breakfast a "Very Heavy" meal can have the weight measure 506 categorized differently than connotation databases associated with languages in which the culture associated with that language considers breakfast as a "Very Light" meal.

The time measure 504 can refer to a time or date associated with the input request 306. For example, for the input request 306 "Meal," the time measure 504 can include times or dates when the meal is typically eaten. For example, dinners can be categorized as typically being eaten in the evenings between 5:00 pm-8:00 pm and breakfasts can be categorized as typically eaten before noon. In another embodiment, the input request 306 "Christmas Dinner" can be categorized as typically being eaten on or around December 25 of the calendar year in a connotation database associated with "U.S. English." The time measure 504 can vary amongst different connotation databases associated with different languages similar to how the weight measure 506 can differ amongst different connotation databases.

The probability measure 502 can refer to the probability that a certain attribute of the input request 306 will be present. Continuing with the example, in one embodiment, for the input request 306 "Meal," the probability measure 502 can represent the probability that the meal will contain, for example, sweets. Other probability measures 502 can be used such as those indicating the probability that the meal will contain, for example, "meat" or a "dessert." In one embodiment, the probability measure 502 can be based on a numerical value range. In one embodiment, the numerical value range range can include a range from 0.0-1.0 indicating how probable it is that the attribute of the input request 306 will be present, with 0.0 representing zero to little probability and 1.0 representing an absolute certainty or a high probability. In another embodiment, the probability measure 502 can be represented using categorizations, for example, "Highly Probable," "Probable," "Not Probable." For example, in the current example where the probability of a meal containing sweets is considered, for meals such as dinner or lunch, the probability measure 502 can be a lower probability while for meals such as snacks the probability measure can be a higher probability. The probability measure 502 can vary amongst different connotation databases associated with different languages similar to how the weight measure 506 can differ amongst different connotation databases.

Continuing with the example, in one embodiment, each word, term, phrase, category, or combination thereof contained a connotation database can be mapped to a point 508 in the cognitive synonym space 500 based on the one or more measures for each word, term, phrase, or category. In the current example, because the cognitive synonym space 500 consists of three points of measure which are the weight measure 506, the probability measure 502, and the time measure 504, the cognitive synonym space can form a three-dimensional space. In one embodiment, the three-dimensional space can be represented with a multi-axis graph representing an (X,Y,Z) axis. The words, terms, phrases, categories, or a combination thereof can be set to a point 508 in the three-dimensional space by connecting the one or more measures along each of their values on each axis. As a result, words, terms, phrases, categories, or a combination thereof with similar values for their one or more measures can be grouped together in clusters within the cognitive synonym space 500. The clusters can form the bases for word, phrase, term, or category groupings. The computing system 100 can use the words, terms, phrases, categories, or a combination thereof to determine the first linguistic context 420, the second linguistic context 440, or a combination thereof and to generate and return the first result 422, the second result 442, or a combination thereof.

For example, in one of the embodiments previously mentioned with respect to FIG. 4, if the input request 306 matches the language associated with the system user's 304 current location 308, the first connotation database 426 is determined and the first linguistic context 420 can be determined based on a mapping of the input request 306 to the words, phrases, categories, or a combination thereof contained in the first connotation database 426 that are similar to, identical to, related to, grouped closely to, or otherwise associated with the words, phrases, categories, associated with the input request 306. Once mapped, the first connotation database 426 can assign the mapped result as the first result 422. For example, assuming the input request 306 is for "Dinner" and the system user's 304 current location 308 is New York City, USA. The first connotation database 426 is determined to be one associated with "U.S. English." The computing system 100 can then look for words, phrases, or categories related to "Dinner" and return mapped words, phrases, or categories as the first result 422. In the aforementioned example, the mapping of the words, phrases, or categories can be done one-to-one and a direct lookup of words, phrases, terms, or categories of the first connotation database 426 can be done because the language of the input request 306 is the same as the language associated with the first connotation database 426 and therefore the same words or phrases can be searched for.

In another embodiment previously mentioned with respect to FIG. 4, if the language of the input request 306 does not match with the system user's 304 current location 308, the computing system 100 will need to map the first linguistic context 420 associated with the first connotation database 426 to the second linguistic context 440 associated with the second connotation database 432 such that the translation module 438 can search for the input request 306 using the equivalent terms and in the same context between the first connotation database 426 and the second connotation database 432. For example, if the input request 306 is for "Dinner" and the system user's 304 current location 308 is in Mexico City, Mexico, then the first connotation database can be associated with "U.S. English" while the second connotation database 432 can be associated with "Mexican Spanish." Thus, the term "Dinner" in the first connotation database 426 must be mapped to the equivalent term in the second connotation database 432 which is "Cena." In one embodiment, the mapping can be done using a distance calculation between words, terms, phrases, or categories in the first connotation database 426 and the second connotation database 432. In one embodiment the distance calculation can be done by taking the point 508 associated with the word, term, phrase, or category in the first connotation database 426 and finding the equivalent point 508 in the second connotation database 432. The computing system 100 can then find words, terms, phrases, or categories, in the second connotation database close to or nearby the point in the second connotation database 432. The computing system 100 can then measure the distances 510 between the equivalent point 508 in the second connotation database 432 and the various words, terms, phrases, or categories. The smaller the distances 510 between the equivalent point 508 and the words, terms, phrases, or categories in the second connotation database 432, the more likely the word, term, phrase, or category in the second connotation database 432 is related to or equivalent to the word, term, phrase, or category of the first connotation database 426. In this embodiment and example, the assumption is that the one or more measures are the same amongst the one or more connotation databases such that points 508 can be mapped equivalently.

An example of the distance calculations is as follows. As shown in FIG. 5, which depicts the aforementioned embodiment, the input request 306 can be "Dinner," which is associated with the first connotation database 426. The second connotation database 432 can be associated with the "Mexican Spanish" language and can contain the terms "Cena," which is the equivalent for "Dinner" and the word "Desayuno" which is the equivalent for "Breakfast." The distance "d1" is the distance between the equivalent point 508 for "Dinner" in the second connotation database 432 and the word "Cena" which has similar or equivalent measures as that for "Dinner." The distance "d2" is the distance between the equivalent point 508 for "Dinner" in the second connotation database 432 and the word "Desayuno" which has different measures as that for "Dinner." Because "d1" is smaller and thus closer to the equivalent point 508 than "d2," the second connotation database will choose the word "Cena" as a mapping to the word "Dinner" and return "Cena" as the second result 442.

While the aforementioned example and embodiment, indicates a single word mapping, the benefits of the invention can be readily realized when searching for more complex phrases or words that do not have equivalents amongst languages. In such situations, words, phrases, terms, or categories with no equivalents can still be mapped based on the one or more measures and the mapping techniques described herein.

It has been discovered that the mapping techniques described herein provides increased usability and accessibility for searching for points of interest 310 in an area where the system user's language 314 is different than the language of the system user's 304 current location 308. The computing system 100 with the first connotation database 426, the second connotation database 432, the first linguistic context 420, and the second linguistic context 432 can provide increase in recognition of natural language or speech patterns such that better translations can be made across languages.

It has been discovered that the computing system 100 with the first connotation database 426, the second connotation database 432, the first linguistic context 420, and the second linguistic context 432 using the mapping techniques disclosed herein can provide increased probability of identifying points of interest 310 relevant to the current situation or condition of the system user 304 without the system user 304 knowing the language associated with the system user's 304 current location 308. As a result, the computer system 100 can lessen the probability that a system user 304 will not find a desired point of interest 310 when they are in a geographic area in which the language of the locate is different from the system user's language 314 or the language of the input request 306.

Figure 6:
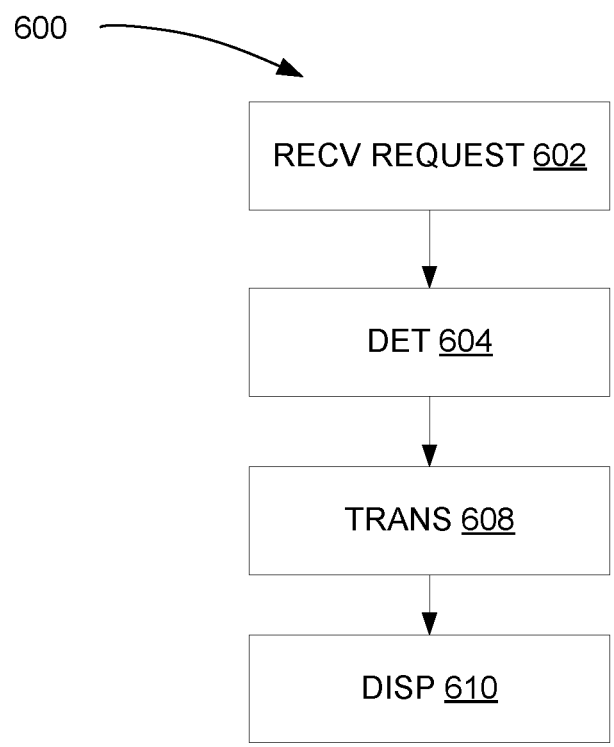
FIG. 6 is a flow chart of a method of operation of the computing system in a further embodiment of the present invention.

Referring now to FIG. 6, therein is shown a flow chart of a method 600 of operation of a computing system in a further embodiment of the present invention. The method 600 includes: receiving 602 an input request 306 for a point of interest 310; determining 604 a first linguistic context 420 for the input request 306 based on one or more input request characteristics 412, a user profile 408, a location 308, and a first connotation database 426; translating 608 the input request 306 to a second linguistic context 440 based on a translation flag 424 and a second connotation database 432, wherein the second connotation database 432 is mapped to the first connotation database 426; and displaying 610 a translation result 318 for the input request 306 based on the first linguistic context 420 or the second linguistic context 440.

The resulting method, process, apparatus, device, product, and system is cost-effective, highly versatile, and accurate, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of the embodiments of the present invention consequently further the state of the technology to at least the next level. While the invention has been described in conjunction with a specific best mode, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
  a control unit configured to:
    receive an input request for a point of interest;
    determine a first linguistic context for the input request for determining a meaning of the input request based on one or more input request characteristics, a user profile, a current location of a system user, and a first connotation database including sets of cognitive synonyms expressing a distinct concept, including differences between a language of the input request and a language of the current location without the system user knowledge of the language of the current location;
    translate the input request to a second linguistic context based on a translation flag and a second connotation database, wherein the second connotation database is mapped to the first connotation database using the sets of cognitive synonyms; and
  a user interface, coupled to the control unit, configured to display a translation result for the input request based on the first linguistic context or the second linguistic context.

2. The system as claimed in claim 1 wherein the first connotation database and the second connotation database comprise one or more categories for classifying language information based on one or more measures.

3. The system as claimed in claim 2 wherein the one or more categories for classifying language information are based on one or more of a culture, a geography, or a time period.

4. The system as claimed in claim 1 wherein translating the input request to the second linguistic context based on the translation flag is based on one or more of a hypernym relationship, a meronym relationship, or a sisternym relationship.

5. The system as claimed in claim 1 wherein
the control unit is further configured to receive a feedback value based on the translation result, wherein the feedback value is for refining a future result for a future input request for the input request; and
further comprising:
a storage unit, coupled to the control unit, for storing the feedback value.

6. A computing system comprising:
a first control unit configured to:
receive an input request for a point of interest;
determine a first linguistic context for the input request for determining a meaning of the input request based on one or more input request characteristics, a user profile, a current location of a system user, and a first connotation database including sets of cognitive synonyms expressing a distinct concept, including differences between a language of the input request and a language of the current location without the system user knowledge of the language of the current location;
a communication unit, coupled to the first control unit, configured to:
send a transmission of the input request to a second control unit based on a translation flag;
receive a translation result for the input request based on a translation of the input request to a second linguistic context by the second control unit;
the second control unit, coupled to the communication unit, configured to translate the input request to the second linguistic context based on the translation flag and a second connotation database, wherein the second connotation database is mapped to the first connotation database using the sets of cognitive synonyms; and
a user interface, coupled to the first control unit, configured to display a translation result for the input request based on the first linguistic context or the second linguistic context.

7. The computing system as claimed in claim 6 wherein the first connotation database and the second connotation database comprise one or more categories for classifying language information based on one or more measures.

8. The computing system as claimed in claim 7 wherein the one or more categories for classifying language information are based on one or more of a culture, a geography, or a time period.

9. The computing system as claimed in claim 6 wherein translating the input request to the second linguistic context based on the translation flag is based on one or more of a hypernym relationship, a meronym relationship, or a sisternym relationship.

10. The computing system as claimed in claim 6 wherein:
the first control unit or the second control unit is further configured to receive a feedback value based on the translation result for refining a future result for a future input request for the input request; and
further comprising:
a storage unit, coupled to the first control unit or the second control unit, for storing the feedback value.

11. A method of operating a computing system comprising:
receiving an input request for a point of interest;
determining a first linguistic context for the input request for determining a meaning of the input request based on one or more input request characteristics, a user profile, a current location of a system user, and a first connotation database including sets of cognitive synonyms expressing a distinct concept, including differences between a language of the input request and a language of the current location without the system user knowledge of the language of the current location;
translating the input request to a second linguistic context based on a translation flag and a second connotation database, wherein the second connotation database is mapped to the first connotation database using the sets of cognitive synonyms; and
displaying a translation result for the input request based on the first linguistic context or the second linguistic context.

12. The method as claimed in claim 11 further comprising classifying language information in the first connotation database and the second connotation database using one or more categories, wherein the classification is based on one or more measures.

13. The method as claimed in claim 12 wherein classifying language information in the one or more categories is based on one or more of a culture, a geography, or a time period.

14. The method as claimed in claim 11 wherein translating the input request to the second linguistic context based on the translation flag is based on one or more of a hypernym relationship, a meronym relationship, or a sisternym relationship.

15. The method as claimed in claim 11 further comprising:
receiving a feedback value based on the translation result, wherein the feedback value is for refining a future result for a future input request for the input request; and
storing the feedback value.

16. The method as claimed in claim 11 further comprising:
sending a transmission of the input request based on the translation flag; and
receiving the translation result for the input request based on the translation of the input request to the second linguistic context.

17. A non-transitory computer readable medium including instructions for operating a computing system comprising:
receiving an input request for a point of interest;
determining a first linguistic context for the input request for determining a meaning of the input request based on one or more input request characteristics, a user profile, a current location of a system user, and a first connotation database including sets of cognitive synonyms expressing a distinct concept, including differences between a language of the input request and a language of the current location without the system user knowledge of the language of the current location;
translating the input request to a second linguistic context based on a translation flag and a second connotation database, wherein the second connotation database is mapped to the first connotation database using the sets of cognitive synonyms; and
displaying a translation result for the input request based on the first linguistic context or the second linguistic context.

18. The non-transitory computer readable medium in claim 17 with instructions further comprising classifying language information in the first connotation database and the second connotation database using one or more categories, wherein the classification is based on one or more measures.

19. The non-transitory computer readable medium in claim 18 with instructions wherein classifying language information in the one or more categories is based on one or more of a culture, a geography, or a time period.

20. The non-transitory computer readable medium in claim 18 with instructions wherein translating the input request to the second linguistic context based on the translation flag is based on one or more of a hypernym relationship, a meronym relationship, or a sisternym relationship.

* * * * *